United States Patent [19]

Dreckmann

[11] Patent Number: 4,531,035
[45] Date of Patent: Jul. 23, 1985

[54] EXPOSED FERRITE CORE IMPEDER

[75] Inventor: Harald J. Dreckmann, Fairfield, Conn.

[73] Assignee: Permag Corporation, Hicksville, N.Y.

[21] Appl. No.: 614,768

[22] Filed: May 29, 1984

[51] Int. Cl.³ .............................................. H05B 6/02
[52] U.S. Cl. .................................. 219/8.5; 219/10.43; 219/10.49 R; 219/61.7; 29/602 R; 29/607
[58] Field of Search ...................... 219/8.5, 9.5, 10.41, 219/10.43, 10.49 R, 61.2, 61.7, 59.1; 29/602 R, 607, 608, 609; 336/233, 234

[56] References Cited

U.S. PATENT DOCUMENTS

| | | | |
|---|---|---|---|
| 2,833,910 | 5/1958 | Stanton et al. | 219/61.2 |
| 2,898,440 | 8/1959 | Rudd et al. | 219/61.2 |
| 3,004,134 | 10/1961 | Allardt | 219/61.2 |
| 3,406,271 | 10/1968 | Cachat et al. | 219/8.5 |
| 3,588,427 | 6/1971 | Oppenheimer et al. | 219/61.2 X |
| 3,941,087 | 3/1976 | Yazaki | 219/8.5 X |
| 4,443,677 | 4/1984 | DeSaw | 219/8.5 |

Primary Examiner—Philip H. Leung
Attorney, Agent, or Firm—Morgan, Finnegan, Pine, Foley & Lee

[57] ABSTRACT

In an induction welding process for metal tubing, an impeder having a fiberglass sleeve and an exposed ferrite core is used to concentrate the flow of current along a seam to be welded. The sleeve at its upstream end is connected to a brass fitting which couples a source of coolant to the impeder. The sleeve is loosely connected to the ferrite core by a pin and the ferrite core is exposed and protrudes from the downstream end of the sleeve, thereby allowing the ferrite core to be placed in close proximity to the welding point of the metal tubing. As coolant flows over the exposed end of the ferrite core, it both cools and cleans the exposed end of the ferrite core.

14 Claims, 2 Drawing Figures

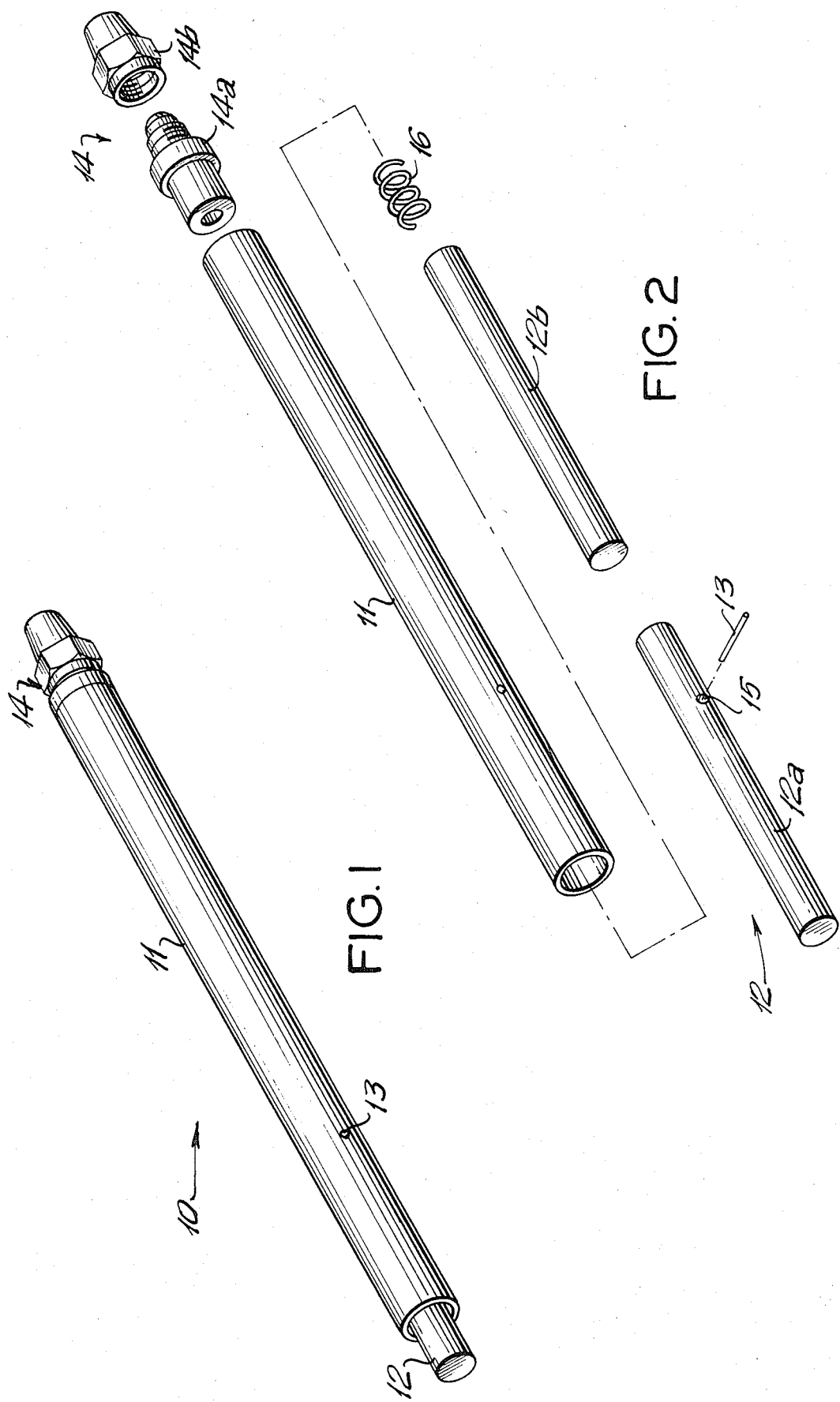

EXPOSED FERRITE CORE IMPEDER

BACKGROUND OF THE INVENTION

1. Field of the Invention

The present invention relates generally to induction welding devices for welding metal tubes and more specifically to an impeder having an exposed ferrite core.

2. Description of the Prior Art

It is well known to those skilled in the art to use high frequency alternating current to weld the edges of a metal tube as it is being formed. Such seam welded metal tubing is generally formed by an apparatus, usually referred to as a tube mill. A flat metal strip, known as a skelp, is formed into a tube or tubing by bringing the edges of the skelp together and then seam welding the edges to form the tubing. As the metal skelp is moving longitudinally through the tube mill, the edges gradually converge at a point, generally referred to as the welding point, and an R-F alternating current is caused to flow along the converging edges and across the welding point. In this manner, the converging edges are preheated and then raised to the welding temperature at the welding point, where they are welded together. The current flow along the converging edges and across the welding point is caused by an inductor spaced above the edges and the welding point and energized by a high frequency power source. In such an apparatus, it has become common practice to provide an impeder within the tube or tubing and directly below the inductor, converging edges and the welding point. The impeder is typically formed from a high magnetic permeability material, such as a ferrite, and causes the current to be concentrated along the edges and across the welding point. Typically, the impeder is coupled to a source of mill coolant which flows over the ferrite to cool it during the welding process.

A representative example of such an impeder is disclosed in U.S. Pat. No. 2,833,910, issued May 6, 1958 and entitled "Tube Welding". The aforementioned patent discloses an impeder having a magnetic core material disposed within a copper sleeve. The magnetic core is prevented from sliding out of the sleeve by a pin located at the end of the sleeve. A cooling fluid or coolant is forced to flow between the sleeve and the magnetic core.

Another representative example of a prior art impeder is disclosed in U.S. Pat. No. 3,004,134, issued Oct. 10, 1961, and entitled "Impeder for Use on a Thermatool Welder". The aforementioned patent discloses an impeder having a bonded iron powder core formed around a bronze rod which are both disposed in fiberglass sleeve. The fiberglass sleeve is coupled to a source of coolant. The bronze rod and bonded iron powder core extend beyond the downstream end of the fiberglass sleeve, and the bonded powdered iron core is retained within the fiberglass sleeve by a cylindrical sleeve rigidly pinned to the bronze rod. A bead trimmer is connected to the end of the bronze rod.

The ferrite materials typically used to make the cores of impeders are very hard, brittle, almost glasslike materials which are extremely difficult to machine. In order to make an inexpensive impeder, simple rods of ferrite, which are not machined have been used as disclosed in the '910 patent described above. Such devices merely prevent the fully enclosed rod from sliding out of the sleeve by using a pin to block the end of the sleeve. The end of the sleeve enclosing the end of the impeder tends to be damaged by molten metal causing the core to slide out, thereby requiring the replacement of the impeder. The replacement of the impeder is time consuming, since the tube mill must be shut down during the replacement process. Even though the impeder itself is relatively inexpensive, the down time of tube mill associated with the replacement of the impeder is an expensive and undesirable undertaking.

The impeder disclosed in the aforementioned '134 patent eliminates some of the problems associated with the impeder of the '910 patent. The impeder of the '134 patent, however, is formed from bonded iron powder telescoped over a bronze rod and is relatively expensive to manufacture. Moreover, due to the bead trimmer and the cylindrical sleeve pinned to the bronze rod it is impossibele to place the bonded powdered iron core in close proximity to the weld point. The close placement of the ferrite core to the weld point improves the efficiency of the welding process, but such close placement is not possible with the aforementioned prior art impeders. Accordingly, there is a need for a relatively inexpensive, long lasting impeder that can be placed in close proximity to the weld during the induction welding of metal tubing.

SUMMARY OF THE INVENTION

The present invention relates to an impeder useful in the induction welding of metal tubing. The impeder includes a core of cylindrical ferrite material that is disposed in a fiberglass sleeve and loosely connected thereto. Preferably the ferrite core is connected to the fiberglass sleeve by a pin which passes through a hole drilled in the ferrite core. One end of the ferrite core is exposed and protrudes from the fiberglass sleeve. The exposed end of the ferrite core can be placed in close proximity to the weld point of the metal tubing. The opposite end of the fiberglass sleeve is connected to a brass fitting which couples a source of coolant to the impeder and allows coolant to flow between the fiberglass sleeve and the ferrite core, and across the exposed end of the ferrite core to provide both a cooling and cleaning action.

BRIEF DESCRIPTION OF THE DRAWINGS

FIG. 1 is a perspective view of the impeder of the present invention; and

FIG. 2 is an exploded perspective view of the impeder of FIG. 1.

DETAILED DESCRIPTION OF THE INVENTION

Referring now to FIG. 1, a perspective view of the impeder 10 of the present invention is provided. The impeder 10 includes an outer sleeve 11 made from fiberglass or some other suitable material. The fiberglass sleeve 11 may also be impregnated with ferrite powder to improve its magnetic qualties. Disposed within the sleeve 11 is a core 12 preferably made of ferrite. The ferrite core 12 has a hole drilled therein and is loosely connected to the fiberglass sleeve 11 by a pin 13. The ferrite core 12 protrudes from the sleeve 11, thereby fully exposing the end of the ferrite core. A brass fitting 14 is connected to the opposite end of the sleeve 11 in order to couple a source of mill coolant to the impeder 10.

The coolant flows from the fitting 14, between the sleeve 11 and the ferrite core 12, and over the exposed portion of the ferrite core in order to prevent damage to the impeder 10. Typically, the welding temperature of the molten metal is approximately 1700° F. and the temperature which the fiberglass sleeve 11 can withstand is approximately 500° F. It can be appreciated, therefore, that the coolant is necessary to prevent the fiberglass sleeve 11 and the ferrite core 12 from being damaged from the high temperatures associated with the induction welding process.

Referring now to FIG. 2, an exploded prespective view of the impeder of FIG. 1 is provided. The ferrite core 12 is illustrated as being comprised of two cylindrical rods 12a and 12b. The ferrite core 12 may be comprised of one rod, or any number of a plurality of rods, but in the preferred embodiment the core 12 is shown as two rods. The ferrite rod 12a includes a hole 15 which may be drilled by a diamond drill, core drill, etc. The ferrite core 12 is loosely connected to the fiberglass sleeve 11 by a pin 13. The upstream end of the fiberglass sleeve 11 has the brass fitting 14 connected thereto. Preferably, the brass fitting 14 is comprised of a threaded portion 14a affixed to the fiberglass sleeve 11 and a hexagonal fitting 14b which can be connected to a source of coolant.

Prior to the core 12 being connected to the fiberglass sleeve 11, a spring 16 may be disposed within the fiberglass sleeve 11. The spring 16 is particularly useful in exerting a force against the ferrite core 12 when it is comprised of a plurality of ferrite rods.

In operation, the impeder 10 is disposed within the metal tube to be welded. The exposed end of the ferrite core 12 may be placed in close proximity to the weld point of the seam to be welded, thereby increasing the efficiency of the induction welding process. A source of coolant is coupled to the brass fitting 14 and the coolant is forced to flow between the fiberglass sleeve 11 and the ferrite core 12. As the coolant flows over the exposed protion of the ferrite core 12 it has a tendency to clean away any molten metal falling from the welded seam directly above. It can be appreciated, therefore, that the coolant performs both a cooling and cleaning function in the apparatus of the present invention.

While the invention has been described in its preferred embodiments it is to be understood that the words which have been used are words of description rather than limitation and that changes may be made within the purview of the appended claims without departing from the true scope and spirit of the invention in its broader aspects.

I claim:

1. An impeder, for use in an induction welding process for welding a seam on metal tubing, which comprises:
    a sleeve;
    a ferromagnetic core having a first end disposed in said sleeve and having a second exposed end which fully protrudes from said sleeve;
    means for penetrating and connecting the first end of said ferromagnetic core to said sleeve; and
    means for coupling coolant to said sleeve such that coolant flows between said sleeve and said ferromagnetic core.

2. An impeder according to claim 1 wherein said means for connecting said ferromagnetic core to said sleeve includes a pin which passes through a hole in said ferromagnetic core.

3. An impeder according to claim 2 which further includes a spring disposed within said sleeve for exerting a force on said ferromagnetic core.

4. An impeder according to claim 3 wherein said means for coupling the coolant includes a fitting.

5. An impeder according to claim 4 wherein said ferromagentic core is comprised of a plurality of cylindrical rods.

6. An impeder according to claim 5 wherein said ferromagnetic core is made from ferrite.

7. An impeder according to claim 6 wherein said sleeve can be made from fiberglass impregnated with ferrite powder.

8. An impeder for use in an inductive welding process for welding a seam on metal tubing which comprised:
    a sleeve;
    a ferromagnetic core, having a first end with a hole drilled therein which is disposed in said sleeve such that second end of the ferromagnetic core is exposed and fully protrudes from said sleeve;
    a pin passing through the hole in the ferromagnetic core for loosely connecting said ferromagnetic core to said sleeve; and
    means for coupling coolant to said sleeve such that coolant flows between said sleeve and said ferromagnetic core.

9. An impeder according to claim 8 which further includes a spring disposed within said sleeve for exerting a force on said ferromagnetic core.

10. An impeder according to claim 9 wherein said means for coupling the coolant includes a fitting.

11. An impeder according to claim 10 wherein said ferromagnetic core is comprised of a plurality of cylindrical rods.

12. An impeder according to claim 11 wherein said ferromagnetic core is made from ferrite.

13. An impeder according to claim 12 wherein said sleeve is made from fiberglass impregnated with ferrite powder.

14. A method of manufacturing an impeder, for use in an induction welding process for welding metal tubing, which comprises the steps of:
    drilling a hole in a first end of a ferrite core;
    placing the ferrite core in a sleeve such that a second exposed end of the ferrite core fully protrudes from the sleeve;
    pinning the ferrite core through the hole to the sleeve; and
    fastening a fitting to the sleeve so that a coolant may flow between the ferrite core and the sleeve.

* * * * *